US012802911B2

(12) United States Patent
Shen et al.

(10) Patent No.: US 12,802,911 B2
(45) Date of Patent: Nov. 17, 2026

(54) DRIVE CIRCUITS FOR MAGNETIC LATCHING RELAYS

(71) Applicant: Eaton Intelligent Power Limited, Dublin (IE)

(72) Inventors: Zhimin Shen, Shenzhen (CN); Lei Cao, Shenzhen (CN); Yulong Hao, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 175 days.

(21) Appl. No.: 18/967,746

(22) Filed: Dec. 4, 2024

(65) Prior Publication Data

US 2025/0201501 A1 Jun. 19, 2025

(30) Foreign Application Priority Data

Dec. 19, 2023 (CN) ........................ 202311748288.6

(51) Int. Cl.
*H01H 47/32* (2006.01)

(52) U.S. Cl.
CPC .................................. *H01H 47/32* (2013.01)

(58) Field of Classification Search
None
See application file for complete search history.

(56) References Cited

PUBLICATIONS

Jinrong Shen et. al, Design of Low Power Intelligent Compound Switch for Reactive Power Compensation Based on Single-chip ATMEGA16L, Dec. 2009, 2009 Second International Symposium on Computational Intelligence and Design (Year: 2009).*

* cited by examiner

*Primary Examiner* — Crystal L Hammond
*Assistant Examiner* — Seung Ho Choi
(74) *Attorney, Agent, or Firm* — Stanek Lemon Crouse & Meeks, PA

(57) ABSTRACT

A drive circuit for a magnetic latching relay is provided, including a reference voltage circuit, configured to provide a reference voltage; a capacitor, including a first terminal configured to receive a control signal and a second terminal configured to receive the reference voltage; a first comparison circuit, configured to receive a voltage of the second terminal of the capacitor, compare the voltage with a first threshold voltage, and output an ON signal when the voltage of the second terminal of the capacitor is greater than the first threshold voltage; and a second comparison circuit, configured to receive a voltage of the second terminal of the capacitor, compare the voltage with a second threshold voltage, and output an OFF signal when the voltage of the second terminal of the capacitor is less than the second threshold voltage.

10 Claims, 5 Drawing Sheets

DRIVE CIRCUITS FOR MAGNETIC LATCHING RELAYS

CROSS-REFERENCE TO PRIORITY APPLICATION

This application claims priority to Chinese Patent Application No. 202311748288.6, filed Dec. 19, 2023, the content of which is hereby incorporated herein by reference in its entirety.

TECHNICAL FIELD

The present inventive concept relates to the field of relays, and in particular, to a drive circuit for a magnetic latching relay.

BACKGROUND

The statements in this part are merely intended to provide background information related to the present inventive concept, to help understand the present inventive concept. This background information does not necessarily constitute the conventional technology.

As a type of relay, a magnetic latching relay serves to connect and disconnect a circuit. Unlike an ordinary electromagnetic relay, the ON and OFF of the magnetic latching relay rely on the action of a permanent magnet steel. The switching between the ON and OFF states of the magnetic latching relay is completed by triggering with a specific amount of pulse electrical signals. The magnetic latching relay features small size, small contact resistance, small rebound time upon closure, and no drive power consumption. However, no matter whether the magnetic latching relay is a single-coil or dual-coil magnetic latching relay, it needs two drive terminals to control its ON and off, which results in poor compatibility. Therefore, a magnetic latching relay drive circuit with better compatibility is needed.

SUMMARY

In view of the foregoing challenges with conventional technology, the present inventive concept provides a drive circuit for a magnetic latching relay, including:

- a reference voltage circuit, configured to provide a reference voltage;
- a capacitor, including a first terminal configured to receive a control signal and a second terminal configured to receive the reference voltage;
- a first comparison circuit, configured to receive a voltage of the second terminal of the capacitor, compare the voltage with a first threshold voltage, and output an ON signal when the voltage of the second terminal of the capacitor is greater than the first threshold voltage; and
- a second comparison circuit, configured to receive a voltage of the second terminal of the capacitor, compare the voltage with a second threshold voltage, and output an OFF signal when the voltage of the second terminal of the capacitor is less than the second threshold voltage.

In some embodiments, the reference voltage circuit includes a second power supply and a first resistor connected between the second power supply and the second terminal of the capacitor. In some embodiments, the reference voltage circuit further includes:

- a third diode connected between the second power supply and the first resistor, where a cathode of the third diode is connected to a positive terminal of the second power supply; and
- a fourth diode and a second resistor that are connected in series between the second power supply and the second terminal of the capacitor, where an anode of the fourth diode is connected to the positive terminal of the second power supply.

In some embodiments, the first comparison circuit includes:

- a first comparator, including a positive input terminal configured to receive the voltage of the second terminal of the capacitor, a negative input terminal configured to receive the first threshold voltage, and an output terminal configured to output the ON signal.

In some embodiments, the first comparison circuit further includes a third resistor and a fourth resistor that are connected in series between a first power supply and a ground, and the negative input terminal of the first comparator is connected to a node between the third resistor and the fourth resistor.

In some embodiments, the second comparison circuit includes:

- a second comparator, including a positive input terminal configured to receive the second threshold voltage, a negative input terminal configured to receive the voltage of the second terminal of the capacitor, and an output terminal configured to output the OFF signal.

In some embodiments, the second comparison circuit further includes a sixth resistor and a seventh resistor that are connected in series between a first power supply and a ground, and the positive input terminal of the second comparator is connected to a node between the sixth resistor and the seventh resistor.

In some embodiments, the magnetic latching relay is a dual-coil magnetic latching relay, the ON signal is output to an ON control terminal of the dual-coil magnetic latching relay, and the OFF signal is output to an OFF control terminal of the dual-coil magnetic latching relay.

In some embodiments, the magnetic latching relay is a single-coil magnetic latching relay, and the drive circuit further includes a full-bridge drive circuit including a first switching transistor and a second switching transistor that are connected in series between two terminals of a third power supply, and a third switching transistor and a fourth switching transistor that are connected in series between two terminals of the third power supply;

- a first control terminal of the single-coil magnetic latching relay is connected to a node between the first switching transistor and the second switching transistor, and a second control terminal of the single-coil magnetic latching relay is connected to a node between the third switching transistor and the fourth switching transistor; and control terminals of the first switching transistor and the fourth switching transistor are configured to receive the ON signal, and control terminals of the second switching transistor and the third switching transistor are configured to receive the OFF signal.

In some embodiments, the first threshold voltage is greater than the reference voltage and is less than a high level of the control signal, and the second threshold voltage is less than the reference voltage and is greater than a low level of the control signal.

According to the drive circuit for a magnetic latching relay in the present inventive concept, when the control signal is at a rising edge, the drive circuit outputs the ON signal, and when the control signal is at a falling edge, the drive circuit outputs the OFF signal. The control logic of the drive circuit is the same as that of a common electromagnetic relay, and can be compatible with a circuit that uses a common electromagnetic relay.

DETAILED DESCRIPTION

To make the objectives, technical solutions, and advantages of the present inventive concept clearer, the following further describes the present inventive concept in detail through the embodiments with reference to the accompanying drawings. It should be noted that the embodiments provided in the present inventive concept are used only for description, and are not intended to limit the protection scope of the present inventive concept.

A magnetic latching relay usually has two control terminals. A dual-coil magnetic latching relay usually has an ON control terminal and an OFF control terminal. When a pulse signal is provided to the ON control terminal, the dual-coil magnetic latching relay can be controlled to turn on; and when a pulse signal is provided to the OFF control terminal, the dual-coil magnetic latching relay can be controlled to turn off. A single-coil magnetic latching relay usually has a first control terminal and a second control terminal. When a control signal is applied to make a current of the single-coil magnetic latching relay flow in a positive direction (for example, from the first control terminal to the second control terminal), the single-coil magnetic latching relay is turned on; and when a control signal is applied to make the current of the single-coil magnetic latching relay flow in a reverse direction (for example, from the second control terminal to the first control terminal), the single-coil magnetic latching relay is turned off.

Therefore, the magnetic latching relay requires two control signals, which means that the magnetic latching relay requires two control ports, for example, two control IO ports. However, a common relay has only one control terminal. When a control signal at the control terminal is at a high level, the relay is turned on; and when the control signal at the control terminal is at a low level, the relay is turned off. Therefore, when a magnetic latching relay is used to replace a common relay in an existing circuit, a control board and control logic need to be changed.

The present inventive concept provides a drive circuit for a magnetic latching relay. Only one control port (for example, a control IO port) is required to control ON and OFF of the magnetic latching relay. In addition, the circuit is simple, and the control logic is the same as that of a common electromagnetic relay.

Figure 1:
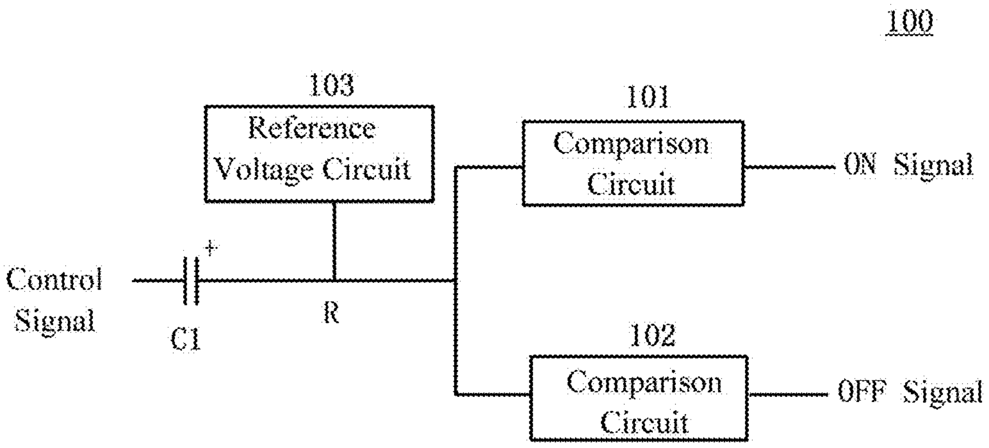
FIG. 1 is a schematic diagram illustrating a drive circuit for a magnetic latching relay according to some embodiments of the present inventive concept.

FIG. 1 shows a schematic diagram of a drive circuit for a magnetic latching relay according to some embodiments of the present inventive concept. As shown in FIG. 1, the drive circuit 100 includes: a capacitor C1 whose first terminal is configured to receive a control signal, and a second terminal (namely, a node R) is connected to a reference voltage circuit 103; a reference voltage circuit 103, configured to provide a reference voltage for the second terminal of the capacitor C1; a comparison circuit 101, configured to receive a voltage from the second terminal of the capacitor C1, compare the voltage with a first threshold voltage, and output an ON signal to a magnetic latching relay when the voltage of the second terminal of the capacitor C1 is greater than the first threshold voltage; and a comparison circuit 102, configured to receive a voltage from the second terminal of the capacitor C1, compare the voltage with a second threshold voltage, and output an OFF signal to the magnetic latching relay when the voltage of the second terminal of the capacitor C1 is less than the second threshold voltage.

In some embodiments, the control signal comes from an IO port of a single-chip microcomputer, a processor, a microcontroller, or the like.

In some embodiments, the reference voltage circuit 103 is a voltage source, which may, for example, provide a reference voltage of 5 V. In further embodiments, the reference voltage circuit 103 includes a voltage source and a resistor, and the resistor is configured to control charging and discharging time of the capacitor C1. In some embodiments, the reference voltage is less than a high level of the control signal.

In some embodiments, the comparison circuit 101 and the comparison circuit 102 each may include a comparator. In some embodiments, the comparison circuit 101 and the comparison circuit 102 each may include a controller.

Figure 2:
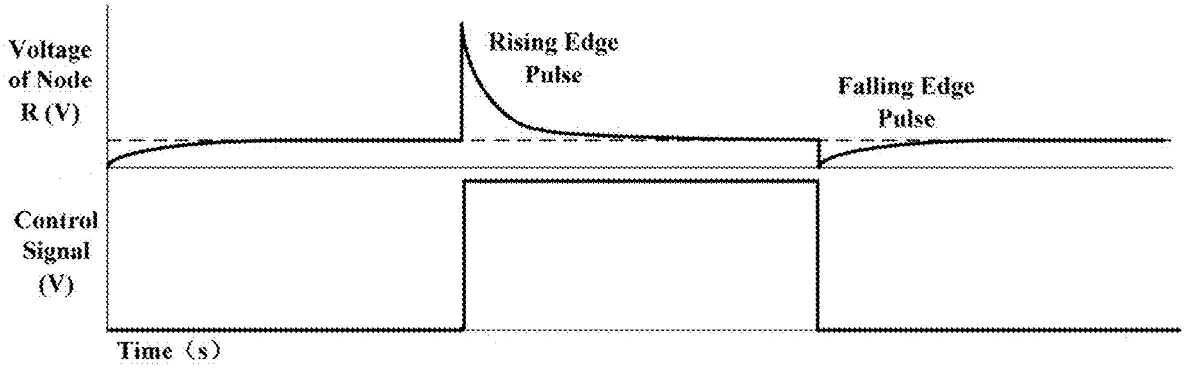
FIG. 2 is a waveform graph illustrating a voltage at a node R and a control signal according to some embodiments of the present inventive concept.

FIG. 2 shows a waveform graph of a voltage at a node R and a control signal according to some embodiments of the present inventive concept. With reference to FIG. 1 and FIG. 2, a principle of the drive circuit for a magnetic latching relay according to the present inventive concept is further described. As shown in FIG. 2, the control signal is a square wave signal that includes a rising edge and a falling edge, and the control signal may have any suitable high level and low level values. In these embodiments, the high level of the square wave signal is 24 V, the low level is 0 V, and an output voltage of the reference voltage circuit 103 is 5 V. When the control signal does not reach the capacitor C1, the voltage at the node R (namely, the second terminal of the capacitor C1) is the reference voltage 5 V. When the rising edge of the control signal reaches the capacitor C1, the voltage of the second terminal of the capacitor C1 rapidly rises to 24 V, and then, because the control signal is maintained at 24 V, the second terminal of the capacitor C1 gradually discharges to the reference voltage 5 V. When the falling edge of the control signal reaches the capacitor C1, the voltage of the second terminal of the capacitor C1 rapidly drops to 0 V, and then, because the control signal is maintained at 0 V, the second terminal of the capacitor C1 gradually charges to the reference voltage 5 V. It can be seen from the curve of the voltage of the node R that two pulses, a rising edge pulse and a falling edge pulse, can be generated at the second terminal of the capacitor C1 by the level change of the control signal. A voltage of the rising edge pulse is greater than the reference voltage, and a voltage of the falling edge pulse is less than the reference voltage.

When the rising edge pulse is greater than the first threshold voltage, the drive circuit 100 outputs an ON signal. When the falling edge pulse is less than the second threshold voltage, the drive circuit 100 outputs an OFF signal. The first threshold voltage is greater than the reference voltage and is less than the high level (for example, 24V) of the control signal, and the second threshold voltage is less than the reference voltage and is greater than the low level (for example, 0 V) of the control signal. When the drive circuit 100 is powered on, because the voltage of the node R is between the low level of the control signal and the reference voltage, the drive circuit also output an OFF signal.

Therefore, when the control signal is at the rising edge, the drive circuit 100 outputs an ON signal, and when the control signal is at the falling edge, the drive circuit 100 outputs an OFF signal. That is, the control logic of the drive circuit 100 in the present inventive concept is the same as that of a common electromagnetic relay, so that the magnetic latching relay in the present inventive concept is compatible with a circuit that uses the common electromagnetic relay.

Figure 3:
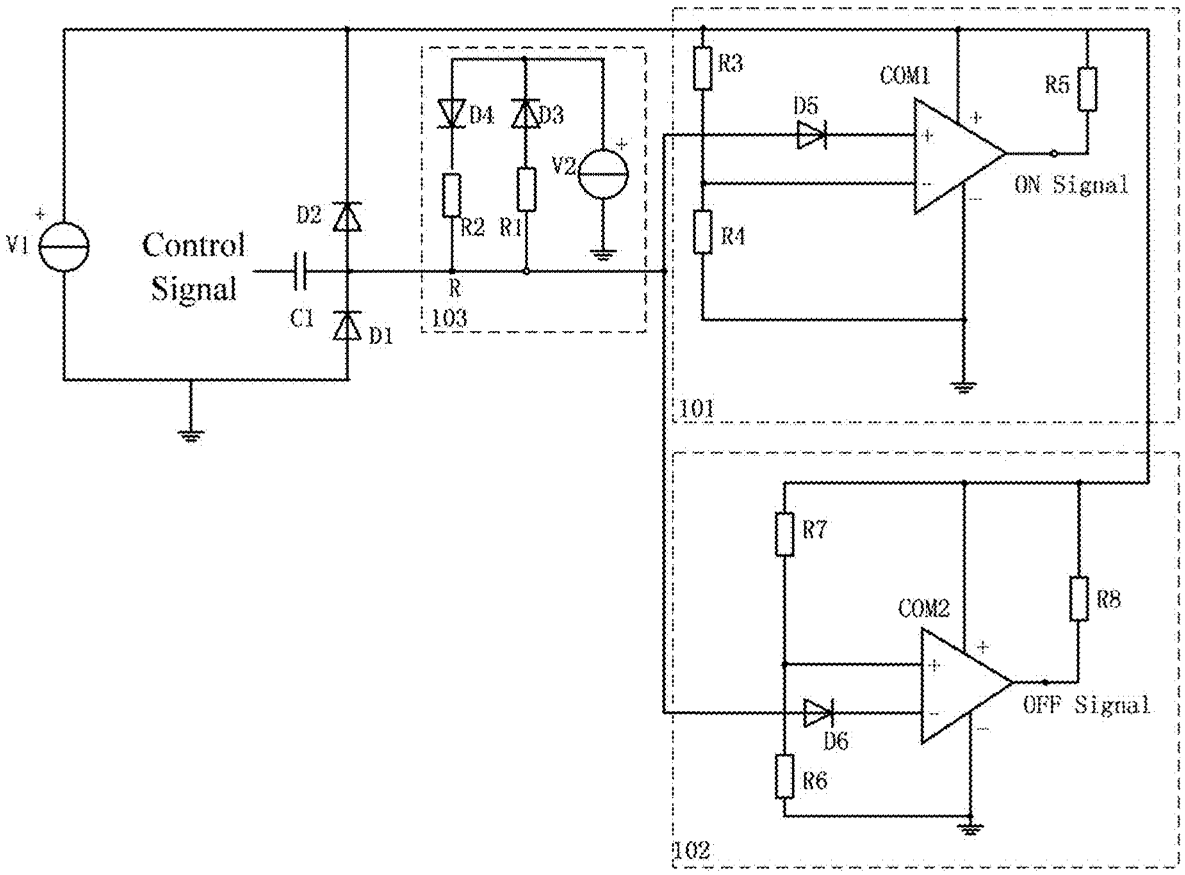
FIG. 3 is a circuit diagram illustrating a drive circuit for a magnetic latching relay according to some embodiments of the present inventive concept.

FIG. 3 shows a circuit diagram of a drive circuit for a magnetic latching relay according to some embodiments of the present inventive concept. With reference to FIG. 1 and FIG. 3, the reference voltage circuit 103 includes: a power supply V2, configured to provide a reference voltage; a diode D4 and a resistor R2 that are connected in series between the power supply V2 and the node R, where an anode of the diode D4 is connected to a positive electrode of the power supply V2; and a diode D3 and a resistor R1 that are connected in series between the power supply V2 and the node R, where a cathode of the diode D3 is connected to the positive electrode of the power supply V2. When the control signal is at a rising edge, a voltage at the node R is at a high level, the voltage at the node R is greater than a voltage of the power supply V2, and a current flows from the node R to the power supply V2 through the resistor R1 and the diode D3, to discharge the second terminal of the capacitor C1. Therefore, the resistor R1 can control a discharging time of the second terminal of the capacitor C1. A larger resistor R1 indicates a longer discharging time. When the control signal is at a falling edge, the voltage at the node R is at a low level, the voltage at the node R is less than the voltage of the power supply V2, and a current flows from the power supply V2 to the node R through the diode D4 and the resistor R2, to charge the second terminal of the capacitor C1. Therefore, the resistor R2 may control a charging time of the second terminal of the capacitor C1. A larger resistor R2 indicates a longer charging time. In some embodiments, the resistor R1 is 820Ω, and the resistor R2 is 1.8 kΩ. In some embodiments, the capacitor C1 is 680 uF. In some embodiments, the power supply V2 may be any suitable value, for example, may be 5 V. The diodes D3 and D4 enable separate adjustment of the charging time and the discharging time. In some embodiments, the diodes D3 and D4 may be omitted, and the reference voltage circuit 103 includes only the power supply V2 and a resistor connected between the power supply V2 and the node R.

The comparison circuit 101 includes a comparator COM1. A positive input terminal of the comparator COM1 receives a voltage from the node R through a diode D5. A negative input terminal of the comparator COM1 is configured to receive the first threshold voltage, and an output terminal of the comparator COM1 is configured to output an ON signal. The comparison circuit 101 further includes a resistor R3 and a resistor R4 that are connected in series between a power supply V1 and a ground, and the negative input terminal of the comparator COM1 is connected to a node between the resistor R3 and the resistor R4. A voltage division between the resistor R3 and the resistor R4 is configured to provide the first threshold voltage. The comparison circuit 101 further includes a resistor R5, connected between the power supply V1 and the output terminal of the comparator COM1, and configured to provide a pull-up voltage. In some embodiments, the resistor R5 may be omitted if the comparator COM1 belongs to a type that does not require a pull-up resistor. The diode D5 is configured to prevent interference and a leakage current. In some embodiments, the diode D5 may also be omitted. In some embodiments, the resistor R3 is 10 kΩ, the resistor R4 is 6.1 kΩ, and the resistor R5 is 1 kΩ. The power supply V1 is further configured to provide a power supply voltage for the comparator COM1, which may be, for example, 5 V, 12 V, 24 V, or any other suitable value.

The comparison circuit 102 includes a comparator COM2. A negative input terminal of the comparator COM2 receives a voltage from the node R through a diode D6. A positive input terminal of the comparator COM2 is configured to receive the second threshold voltage, and an output terminal of the comparator COM2 is configured to output an OFF signal. The comparison circuit 102 further includes a resistor R7 and a resistor R6 that are connected in series between the power supply V1 and the ground, and the positive input terminal of the comparator COM2 is connected to a node between the resistor R7 and the resistor R6. A voltage division between the resistor R7 and the resistor R6 is configured to provide the second threshold voltage. The comparison circuit 102 further includes a resistor R8, connected between the power supply V1 and the output terminal of the comparator COM2, and configured to provide a pull-up voltage. In some embodiments, the resistor R8 may be omitted if the comparator COM2 belongs to a type that does not require a pull-up resistor. The diode D6 is configured to prevent interference and a leakage current. In some embodiments, the diode D6 may also be omitted. In some embodiments, the resistor R7 is 18 kΩ, the resistor R6 is 2.1 kΩ, and the resistor R8 is 1 kΩ. The power supply V1 is further configured to provide a power supply voltage for the comparator COM2.

The drive circuit in FIG. 3 further includes a diode D1 and a diode D2 that are connected in series between two terminals of the power supply V1, an anode of the diode D1 is connected to a negative electrode (namely, the ground) of the power supply V1, and a cathode is connected to the second terminal of the capacitor C1. An anode of the diode D2 is connected to the second terminal of the capacitor C1, and a cathode is connected to a positive electrode of the power supply V1. In some embodiments, the diodes D1 and D2 may be omitted.

In some embodiments, instead of a voltage division circuit, the first threshold voltage and the second threshold voltage may be directly provided by a power supply.

Figure 4:
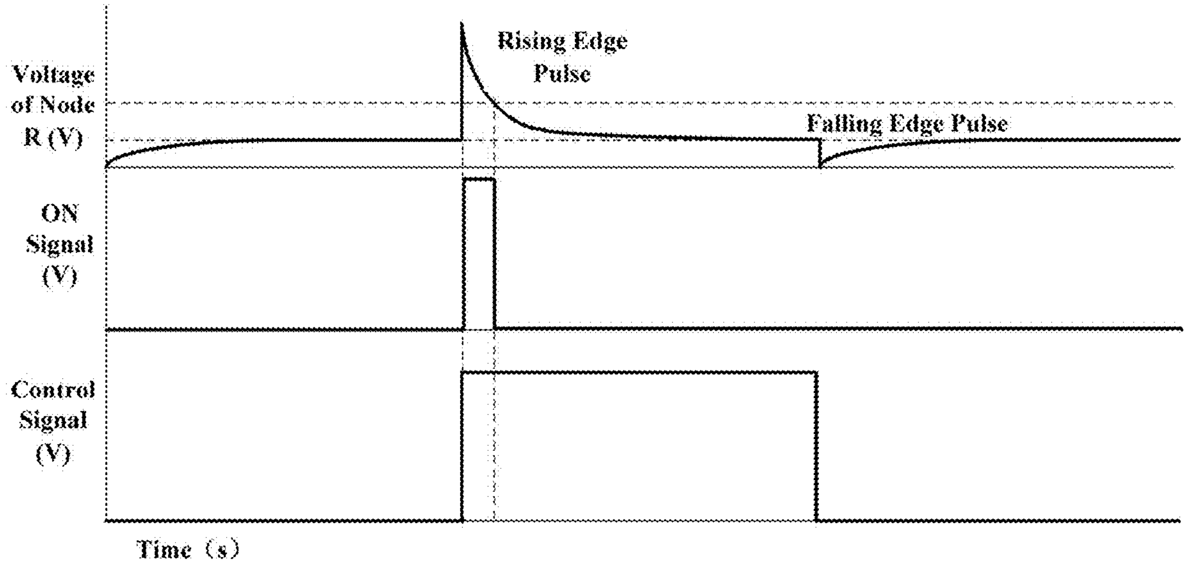
FIG. 4 is a schematic diagram illustrating an ON signal output by the drive circuit in FIG. 3.
Figure 5:
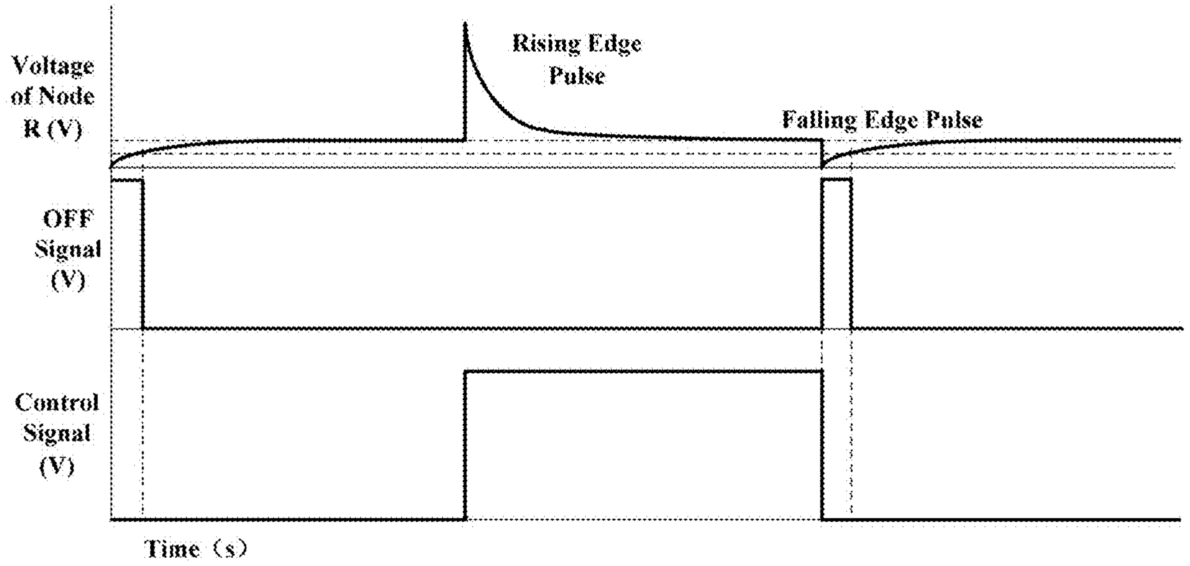
FIG. 5 is a schematic diagram illustrating an OFF signal output by the drive circuit in FIG. 3.

FIG. 4 shows a schematic diagram of an ON signal output by the drive circuit in FIG. 3, which shows the voltage of the node R, the ON signal, and a waveform of the control signal. FIG. 5 shows a schematic diagram of an OFF signal output by the drive circuit in FIG. 3, which shows the voltage of the node R, the OFF signal, and a waveform of the control signal. In the embodiments of FIG. 4 and FIG. 5, a high level of the square wave signal is 24 V, a low level is 0 V, an output voltage of the reference voltage circuit 103 is 5 V, the first threshold voltage is 10 V, and the second threshold voltage is 2.5V.

With reference to FIG. 3 and FIG. 4, when the control signal is at the rising edge, the voltage of the node R is a rising edge pulse, a maximum voltage of the node R is 24 V, and a minimum voltage of the node R is the reference voltage 5 V, so that the voltage of the positive input terminal of the comparator COM1 is greater than the first threshold voltage of the negative input terminal, and then an ON signal is output. In these embodiments, the ON signal is a square wave pulse of 24 V.

With reference to FIG. 3 and FIG. 5, when the control signal is at the falling edge, the voltage of the node R is a falling edge pulse, the minimum voltage of the node R is 0 V, and the maximum voltage of the node R is the reference voltage 5 V, so that the second threshold voltage of the positive input terminal of the comparator COM2 is greater than the voltage of the negative input terminal, and an OFF signal is output. In this embodiment, the OFF signal is a square wave pulse of 24 V. In addition, during power-on, because the voltage of the node R is between 0 V and 5 V, an OFF signal is also output. Therefore, before a function test or delivery of a PCBA board, a relay can be maintained in an initial OFF state only by powering on.

For a dual-coil magnetic latching relay, the ON signal in the drive circuit of the present inventive concept may be directly output to an ON control terminal of the dual-coil magnetic latching relay, and the OFF signal is output to an OFF control terminal of the dual-coil magnetic latching relay. When the control signal is at the rising edge, the drive circuit outputs the ON signal, to drive the magnetic latching relay to be turned on. When the control signal is at the falling edge, the drive circuit outputs the OFF signal, to drive the magnetic latching relay to be turned off.

Figure 6:
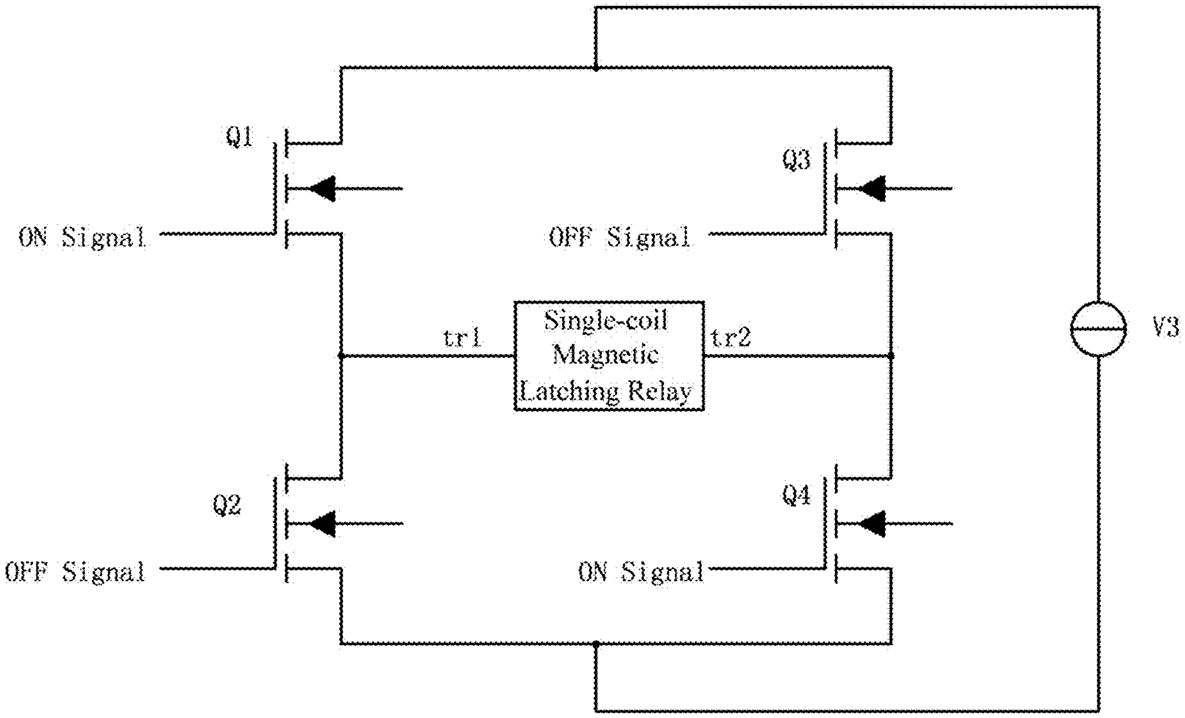
FIG. 6 is a schematic diagram illustrating a full-bridge drive circuit for a single-coil magnetic latching relay according to some embodiments of the present inventive concept.

For a single-coil magnetic latching relay, the drive circuit of the present inventive concept further needs to include a full-bridge drive circuit. FIG. 6 shows a schematic diagram of a full-bridge drive circuit for a single-coil magnetic latching relay according to some embodiments of the present inventive concept. The full-bridge drive circuit includes a switching transistor Q1 and a switching transistor Q2 that are connected in series between two terminals of a power supply V3, and a switching transistor Q3 and a switching transistor Q4 that are connected in series between two terminals of the power supply V3. A first control terminal tr1 of the single-coil magnetic latching relay is connected to a node between the switching transistor Q1 and the switching transistor Q2, and a second control terminal tr2 of the single-coil magnetic latching relay is connected to a node between the switching transistor Q3 and the switching transistor Q4. Control terminals of the switching transistor Q1 and the switching transistor Q4 are configured to receive an ON signal, and control terminals of the switching transistor Q2 and the switching transistor Q3 are configured to receive an OFF signal. When a control signal is at a rising edge, the drive circuit outputs an ON signal, the switching transistors Q1 and Q4 are turned on, the switching transistors Q2 and Q3 are turned off, and a current flows from the first control terminal tr1 of the single-coil magnetic latching relay to the second control terminal tr2, to drive the magnetic latching relay to be turned on. When the control signal is at a falling edge, the drive circuit outputs an OFF signal, qthe switching transistors Q2 and Q3 are turned on, the switching transistors Q1 and Q4 are turned off, and the current flows from the second control terminal tr2 of the single-coil magnetic latching relay to the first control terminal tr1, to drive the magnetic latching relay to be turned off.

In some embodiments, the switching transistors Q1-Q4 may be, for example, triodes, MOS transistors, IGBTs, switches, relays, or the like. In some embodiments, the power supply V3 may be, for example, 5 V, 12 V, 24 V, or any other suitable value.

According to the drive circuit for a magnetic latching relay provided by the present inventive concept, when the control signal is at the rising edge, the drive circuit outputs the ON signal, and when the control signal is at the falling edge, the drive circuit outputs the OFF signal. The drive circuit in the present inventive concept needs only one control signal port (for example, a control IO port) to control ON and OFF of the magnetic latching relay, and control logic of the drive circuit is the same as that of a common electromagnetic relay, so that the magnetic latching relay in the present inventive concept can be compatible with a circuit that uses the common electromagnetic relay without changing a control board and the control logic.

Although the present inventive concept has been described by using embodiments, the present inventive concept is not limited to the embodiments described herein, and includes various changes and variations without departing from the scope of the present inventive concept.

What is claimed is:

1. A drive circuit for a magnetic latching relay, comprising:
- a reference voltage circuit, configured to provide a reference voltage;
- a capacitor, comprising a first terminal configured to receive a control signal and a second terminal configured to receive the reference voltage;
- a first comparison circuit, configured to receive a voltage of the second terminal of the capacitor, compare the voltage with a first threshold voltage, and output an ON signal when the voltage of the second terminal of the capacitor is greater than the first threshold voltage; and
- a second comparison circuit, configured to receive a voltage of the second terminal of the capacitor, compare the voltage with a second threshold voltage, and output an OFF signal when the voltage of the second terminal of the capacitor is less than the second threshold voltage.

2. The drive circuit for a magnetic latching relay of claim 1, wherein the reference voltage circuit comprises a second power supply and a first resistor connected between the second power supply and the second terminal of the capacitor.

3. The drive circuit for a magnetic latching relay of claim 2, wherein the reference voltage circuit further comprises:
- a third diode connected between the second power supply and the first resistor, wherein a cathode of the third diode is connected to a positive terminal of the second power supply; and
- a fourth diode and a second resistor that are connected in series between the second power supply and the second terminal of the capacitor, wherein an anode of the fourth diode is connected to the positive terminal of the second power supply.

4. The drive circuit for a magnetic latching relay of claim 1, wherein the first comparison circuit comprises:
- a first comparator, comprising a positive input terminal configured to receive the voltage of the second terminal of the capacitor, a negative input terminal configured to receive the first threshold voltage, and an output terminal configured to output the ON signal.

5. The drive circuit for a magnetic latching relay of claim 4, wherein the first comparison circuit further comprises a third resistor and a fourth resistor that are connected in series between a first power supply and a ground, and the negative input terminal of the first comparator is connected to a node between the third resistor and the fourth resistor.

6. The drive circuit for a magnetic latching relay of claim 1, wherein the second comparison circuit comprises:

a second comparator, comprising a positive input terminal configured to receive the second threshold voltage, a negative input terminal configured to receive the voltage of the second terminal of the capacitor, and an output terminal configured to output the OFF signal.

7. The drive circuit for a magnetic latching relay of claim 6, wherein the second comparison circuit further comprises a sixth resistor and a seventh resistor that are connected in series between a first power supply and a ground, and the positive input terminal of the second comparator is connected to a node between the sixth resistor and the seventh resistor.

8. The drive circuit for a magnetic latching relay of claim 1, wherein the magnetic latching relay is a dual-coil magnetic latching relay, the ON signal is output to an ON control terminal of the dual-coil magnetic latching relay, and the OFF signal is output to an OFF control terminal of the dual-coil magnetic latching relay.

9. The drive circuit for a magnetic latching relay of claim 1, wherein the magnetic latching relay is a single-coil magnetic latching relay, and the drive circuit further comprises a full-bridge drive circuit comprising a first switching transistor and a second switching transistor that are connected in series between two terminals of a third power supply, and a third switching transistor and a fourth switching transistor that are connected in series between two terminals of the third power supply;

a first control terminal of the single-coil magnetic latching relay is connected to a node between the first switching transistor and the second switching transistor, and a second control terminal of the single-coil magnetic latching relay is connected to a node between the third switching transistor and the fourth switching transistor; and control terminals of the first switching transistor and the fourth switching transistor are configured to receive the ON signal, and control terminals of the second switching transistor and the third switching transistor are configured to receive the OFF signal.

10. The drive circuit for a magnetic latching relay of claim 1, wherein the first threshold voltage is greater than the reference voltage and is less than a high level of the control signal, and the second threshold voltage is less than the reference voltage and is greater than a low level of the control signal.

* * * * *